(12) United States Patent
Terem et al.

(10) Patent No.: US 11,256,040 B1
(45) Date of Patent: Feb. 22, 2022

(54) OPTICAL COUPLER AND A METHOD FOR ASSEMBLING AN OPTICAL COUPLER

(71) Applicant: DustPhotonics, Modiin (IL)

(72) Inventors: Adaya Terem, Tel Aviv (IL); Yoel Chetrit, Kfar Ben Nun (IL); Amir Geron, Modiin (IL); Moti Cabessa, Netanya (IL)

(73) Assignee: DUSTPHOTONICS LTD., Modiin (IL)

( * ) Notice: Subject to any disclaimer, the term of this patent is extended or adjusted under 35 U.S.C. 154(b) by 0 days.

(21) Appl. No.: 16/878,544

(22) Filed: May 19, 2020

Related U.S. Application Data

(60) Provisional application No. 62/849,918, filed on May 19, 2019.

(51) Int. Cl.
*G02B 6/38* (2006.01)

(52) U.S. Cl.
CPC ......... *G02B 6/3843* (2013.01); *G02B 6/3839* (2013.01); *G02B 6/3855* (2013.01); *G02B 6/3825* (2013.01)

(58) Field of Classification Search
CPC ........ G02B 6/32; G02B 6/3839; G02B 6/322; G02B 6/3885; G02B 6/3882; G02B 6/325
See application file for complete search history.

(56) References Cited

U.S. PATENT DOCUMENTS

| | | | | |
|---|---|---|---|---|
| 2002/0197047 A1* | 12/2002 | Basavanhally | ...... | G02B 6/3644 385/137 |
| 2003/0002803 A1* | 1/2003 | Trezza | ................. | G02B 6/4249 385/53 |
| 2003/0007758 A1* | 1/2003 | Rose | .................... | G02B 6/3833 385/115 |
| 2006/0245694 A1* | 11/2006 | Chen | ........................ | G02B 6/32 385/71 |
| 2011/0026882 A1* | 2/2011 | Budd | .................... | G02B 6/3885 385/52 |

* cited by examiner

*Primary Examiner* — Ryan A Lepisto
*Assistant Examiner* — Erin D Chiem
(74) *Attorney, Agent, or Firm* — Reches Patents (57) ABSTRACT

The disclosure describes a method for assembling an optical coupler, the method may include (a) inserting optical fibers of an array of optical fibers through an array of openings of a mount of the optical coupler so that tips of the optical fibers pass through the array of openings of the mount and reach an adaptor; wherein the array of openings of the mount exhibit a first positioning accuracy; (b) using the adaptor to position the tips of the optical fibers at predefined locations, at a second positioning accuracy that is higher than the first positioning accuracy; (c) fixing the tips of the optical fibers to the mount while maintaining the tips of the optical fibers at the predefined locations; and (d) detaching the mount from the adaptor.

16 Claims, 8 Drawing Sheets

Movement 40 introduced by jig

FIG. 5

Inserting optical fibers of an array of optical fibers through the array of openings of the mount and reach an adaptor; wherein the array of openings of the mount exhibit a first positioning accuracy
110

Using an adaptor to position for positioning the tips of the optical fibers at predefined locations, at a second positioning accuracy that is higher than the first positioning accuracy
120

Fixing the tips of the optical fibers to the mount while maintaining the tips of the optical fibers at the predefined locations. 130

Detaching the mount from the adapter 140

Connecting the optical coupler to an array of electro-optic elements.
150

OPTICAL COUPLER AND A METHOD FOR ASSEMBLING AN OPTICAL COUPLER

CROSS REFERENCE

This application claims priority from U.S. provisional patent 62/849,918 filing date May 19, 2019, which is incorporated herein by reference.

BACKGROUND

Optical couplers may be used to position optical fibers in a desired spatial relationship related to electrooptical components.

The optical fibers should be positioned at certain locations at a very high accuracy level—for example—allowed location deviations may be limited to few microns.

Various prior art optical couplers were manufactured to include apertures that are shaped, sized and positioned at the very high accuracy level—allowing location deviations of (for example) few microns.

The manufacturing process of such prior art optical couplers is costly and exhibits a low yield.

SUMMARY

There may be provided a method for assembling an optical coupler, the method may include (a) inserting optical fibers of an array of optical fibers through an array of openings of a mount of the optical coupler so that tips of the optical fibers pass through the array of openings of the mount and reach an adaptor; wherein the array of openings of the mount exhibit a first positioning accuracy; (b) using an adaptor to position for positioning the tips of the optical fibers at predefined locations, at a second positioning accuracy that is higher than the first positioning accuracy; (c) fixing the tips of the optical fibers to the mount while maintaining the tips of the optical fibers at the predefined locations; and (d) fixing the tips of the optical fibers to the mount while maintaining the tips of the optical fibers at the predefined locations There may be provided an optical coupler that may include a mount and an array of optical fibers, wherein the array of fibers pass through openings of the mount, wherein the array of openings exhibit a first degree of positioning accuracy, wherein the openings are of a first area; wherein tips of the optical fibers are fixed to the mount and are positioned at predefined locations at second positioning accuracy that is higher than the first positioning accuracy.

The optical coupled many be assembled using any of the methods illustrated in the specification.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a module capable of executing the method.

Any reference in the specification to a module should be applied mutatis mutandis to a method that may be executed by the module.

The term "substantially"—unless stated otherwise may refer to a deviation of few percent (for example—deviation of less than ten percent or less than 20 percent).

Any combination of any module, die, circuit, or component listed in any of the figures, any part of the specification and/or any claims may be provided. Especially any combination of any claimed feature may be provided.

Any size, length or width illustrated in the drawings is a non-limiting example.

The terms apertures and openings are used in an interchangeable manner.

There may be provided an optical coupler and a method for assembling the optical coupler.

There may be provided an optical coupler that may have a low profile and small footprint. The optical mount can be used in virtually any optical module—even in SFP, QSFP DD. DR4 compliant devices. For example—the height may be even less than few millimeters (for example even less than 3 millimeters). The compact optical coupler may include many optical fibers—for example eight. For example, an optical coupler may include mount that has width and length of about four by six millimeters (and a height of about three till four millimeters) may support eight optical fibers.

The optical coupler may be used in various optical assemblies such as optical transceivers, on-board optical engines.

Optical fibers such as an optical fiber array may be used for passive or active assembly on a printed circuit board where the optical fiber array can be aligned to an optical transmitter, receiver or both components in a form of a semiconductor chip.

The optical coupler can be configured to couple light to vertically illuminated photodiodes or to vertically illuminating laser diodes. The vertical angle is an example of a possible illumination angle and/or reception angle—other angles (for example any oblique angle) may be accommodated by the optical coupler.

The optical coupler may include a mount that include multiple apertures that are manufactured at a low accuracy level (lower than the high accuracy level). The low accuracy level may exhibit location errors that exceeds (for example by a factors of 5, 10, 25, 50, 100 and more) the required high accuracy level (for example a few microns, few may be less than 5, 10, 20, 25 micron) required for the positioning of the optical fibers.

The apertures are much larger than the required high accuracy level—and are large enough to cover the pre-defined areas and expected location deviations of the tips due to the inaccuracy of the openings.

Each aperture "covers" a desired location of an optical fiber.

The manufacturing process includes inserting the optical fibers through the aperture of the mount (for example from one side of the optical mount to a second side of the optical mount)—so that at least the tips of the optical fibers extend out of the mount.

A highly accurate adaptor (for example a highly accurate jig) has apertures of adjustable size. The apertures may be adapted to change their opening from an first state (corresponding to the first configuration of the jig) in which the openings are large enough to receive the optical fibers that pass through the mount—despite any possible large location errors, to a second state (corresponding to the second configuration of the jig)—in which the apertures are much smaller and hold the optical fibers to be at an exact location—at the required high accuracy level. Each opening may include a shutter that may move between the first and second states.

After the apertures are positioned at the second position—the optical fibers are glued or otherwise fixed to the mount—while maintaining their final position—which exhibits a high level of accuracy.

The jig is used during the assembling process for multiple optical couplers—thus allowing low cost and low accuracy mounts to be manufactured and used to achieve a high accuracy optical coupler.

The mount may be provided to fit any number of optical fibers. Multiple optical fibers may be arranged in any format—linear array, two dimensional array, and the like.

The optical fiber array can be bent (relation between entrance angle to output angle—in relation to the mount) of any angle—for example ninety degrees.

The optical coupler may be used for passive assembly process.

The optical coupler may maintain any desired return loss—for example a 26 dB return loss. This may be obtained by:

a. Index matching material between the cleaved optical fiber to semiconductor chip
b. Angle cleaved optical fiber The optical coupler is cost effective a. The optical fiber array may be mounted on a single mount.
b. The assembly process allows to use cheap and simple mounts with no tight tolerances (in contrast to common practice in the optic industry).
c. A laser cleaving process allows optical grade fiber tip which meets optical requirements—No polish is needed.
d. The tight tolerances of optical fibers position is achieved by a dedicated jig providing the tight tolerances required, one example—an adaptor with V-grooves or any other shaped and/or sized positioning elements.
e. The jig is removed after the optical fibers are positioned in place.

FIGS. 1-4 illustrate examples of an optical coupler that includes optical fibers 20 and a mount 10. The mount 10 has an array of apertures 12 (low accuracy apertures) that may be formed at a bottom part 14 of the mount though which the optical fibers (or at least some parts of the optical fibers—such as the tips 22 of the optical fibers) should pass.

Figure 1:
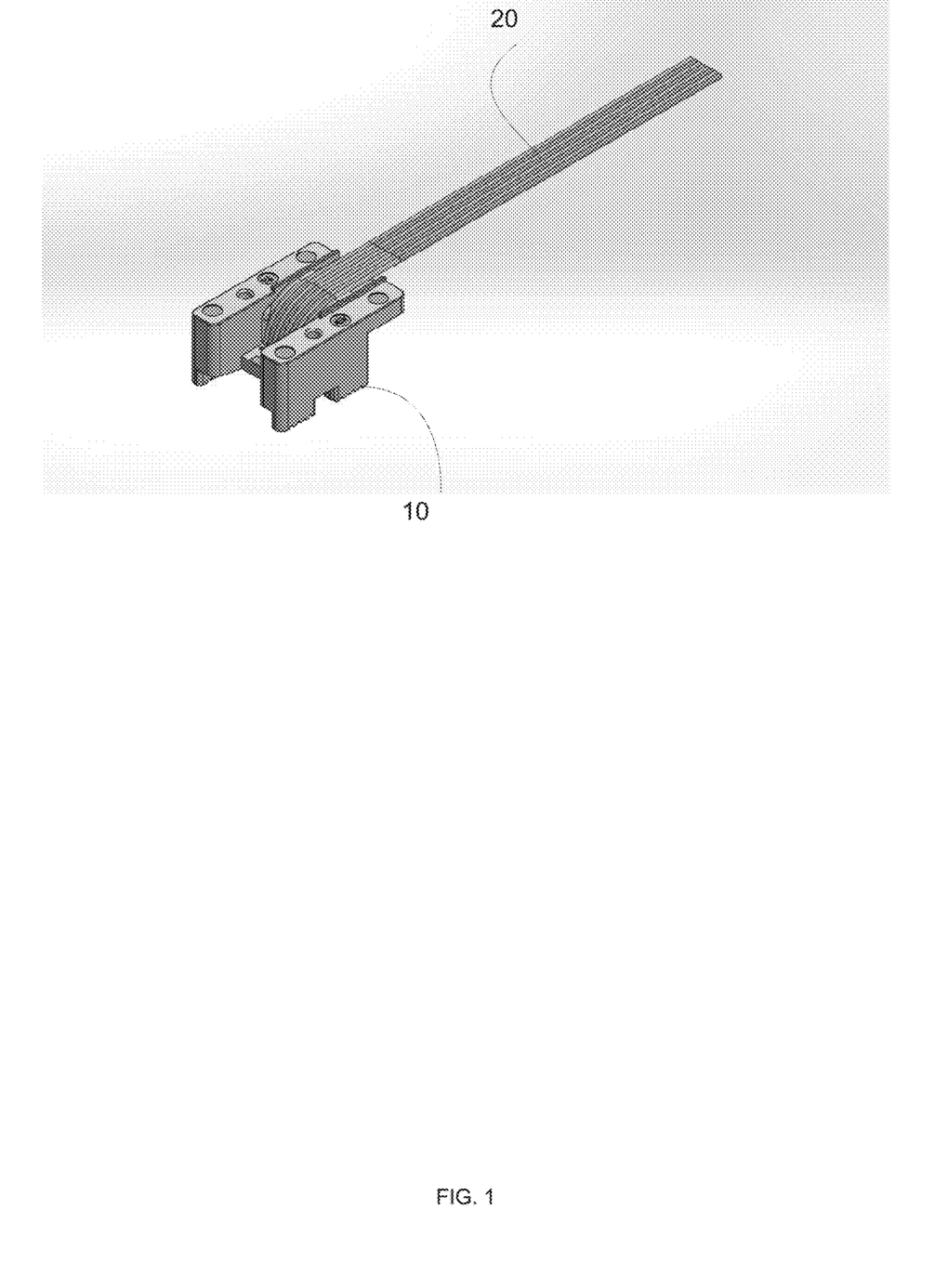
FIG. 1 illustrates an example of an optical coupler.
Figure 2:
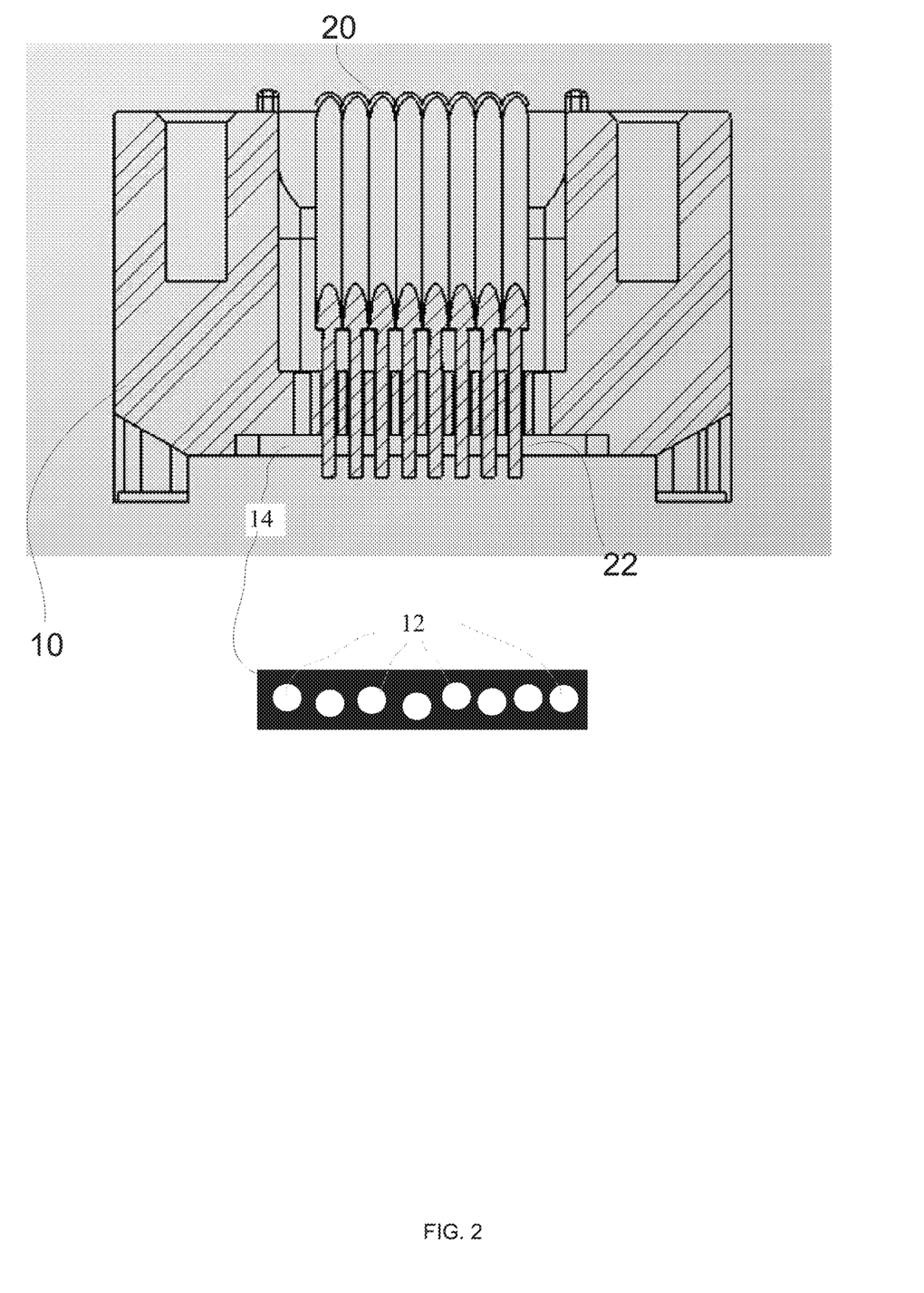
FIG. 2 illustrates an example of an optical coupler.

FIG. 2 also illustrates that the apertures 12 are of low accuracy and may be misaligned. Any other misalignment may be provided. The misalignment represents a first level of positioning accuracy.

Figure 3:
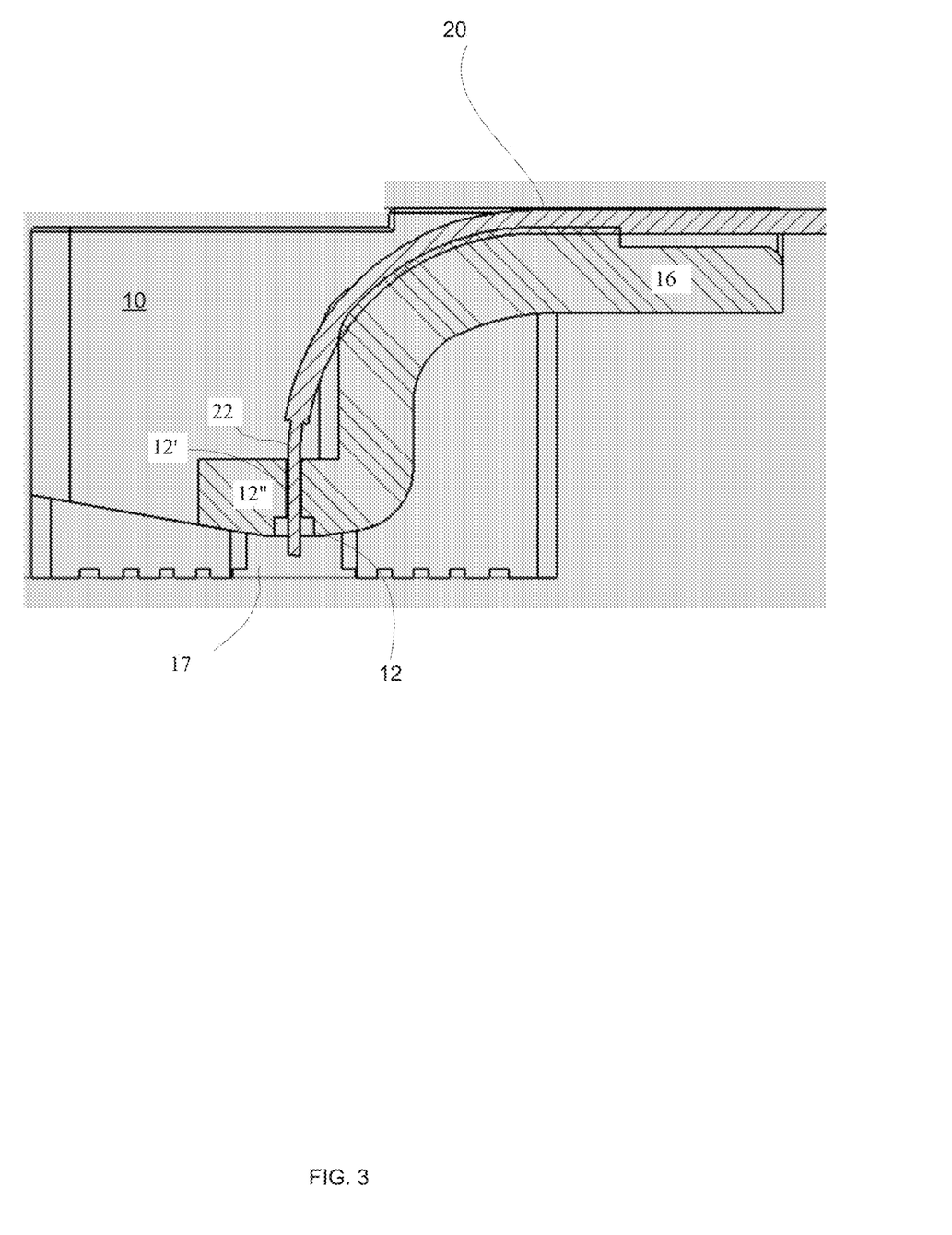
FIG. 3 illustrates an example of an optical coupler.

FIG. 3 is an example of a cross section of the optical coupler and illustrates that the mount may have a supporting element—such as curved supporting element 16 for supporting the body of an optical cable of the array. The tip 21 of the optical cable passes through an opening 12 that may have an upper part 12' and a lower part 12" that is wider than the upper part. The tip of the optical fiber extends outside (beneath) the opening 12 and enters a space 17 formed below the array of openings.

Figure 4:
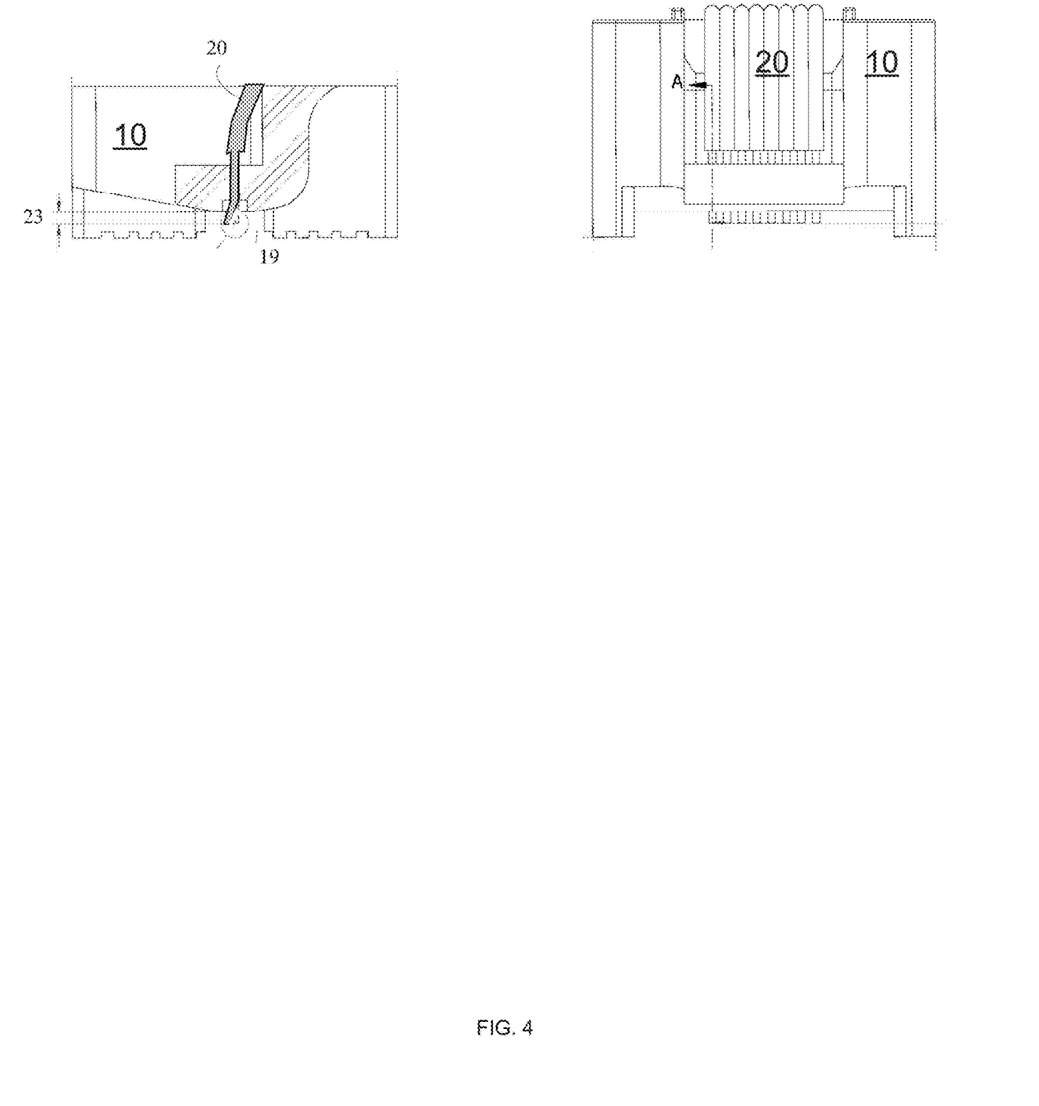
FIG. 4 illustrates an example of an optical coupler.

FIG. 4 illustrates that the tip of the optical fiber was slightly moved to a predefined position and that a glue 19 (of a thickness denoted 23) was placed within at least a part of the space 17 to fix the tip of to the mount and maintain the tip of the optical fiber at a predefined location.

Figure 5:
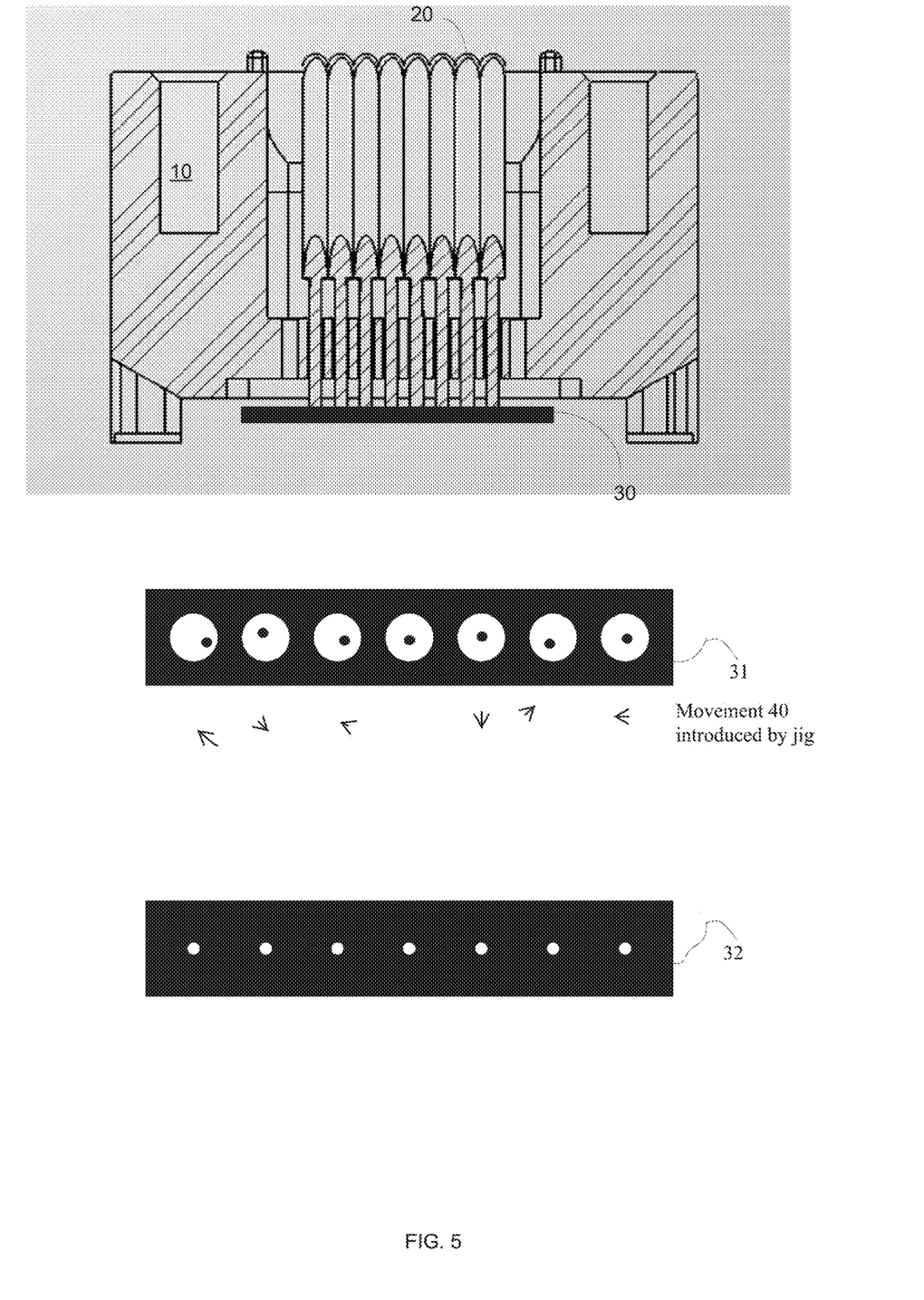
FIG. 5 illustrates an example of an optical coupler and an adaptor.

FIG. 5 illustrates an optical coupler and an adaptor 30 at a first configuration 31 and at a second configuration 32. FIG. 5 also illustrated the out of scale movements 40 of the tips of the optical fibers from their locations within the adaptor openings when at a first configuration—to their final positions—when the adaptor as at a second configuration.

A change in a configuration of the adaptor from a first configuration to a second configuration positions the tips of the optical fibers at predefined locations, at a second positioning accuracy that is higher than the first positioning accuracy.

The jig and the optical coupler may be aligned in any manner before inserting the optical tips to the jig openings. This may include, maintaining the jig at a fixed location and performing a registration process to position the optical coupler to be aligned with the jig.

Figure 6:
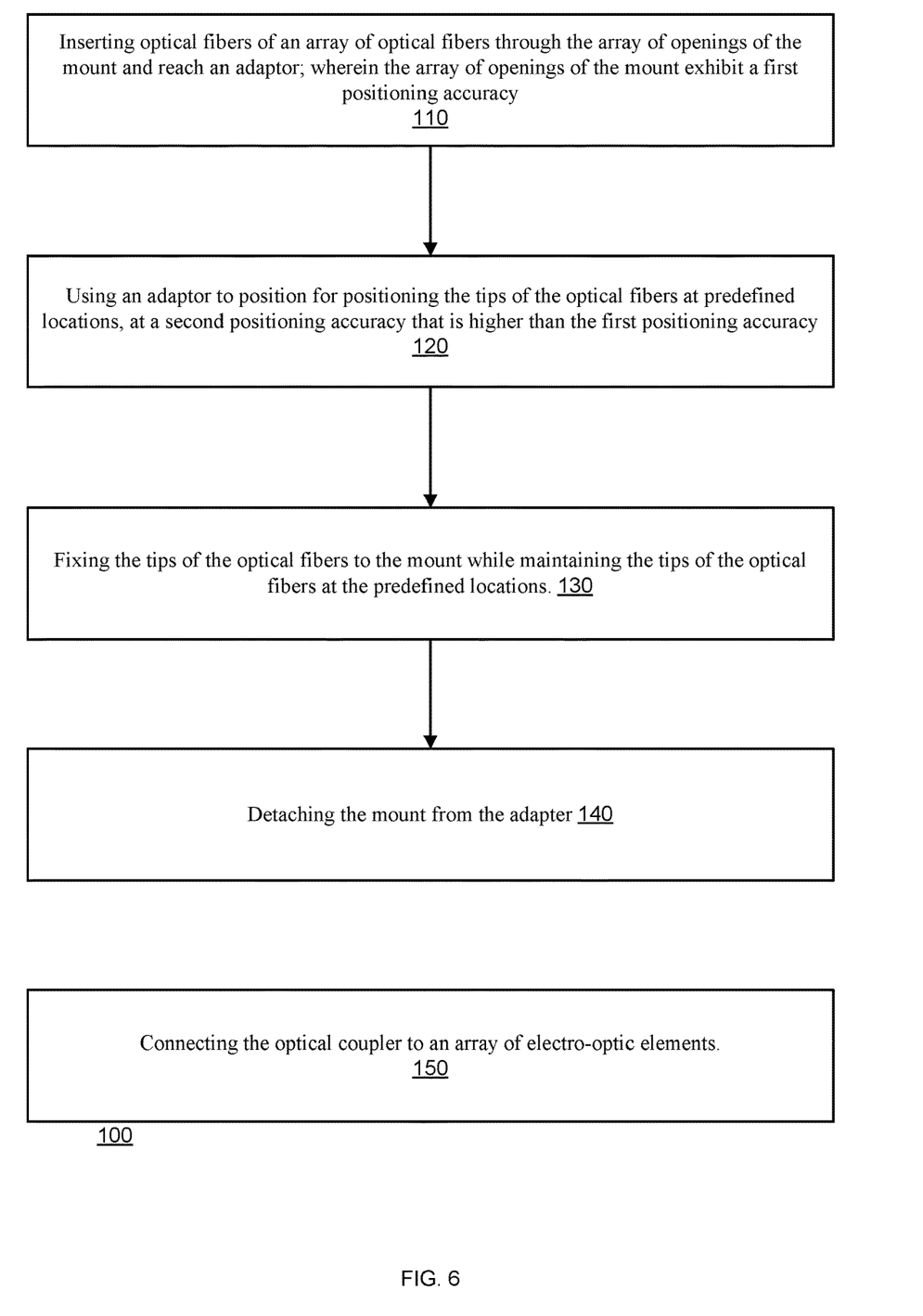
FIG. 6 illustrates an example of a method.

FIG. 6 illustrates method 100 for assembling an optical coupler.

Method 100 may include step 110 of inserting optical fibers of an array of optical fibers through the array of openings of the mount and reach an adaptor; wherein the array of openings of the mount exhibit a first positioning accuracy.

Step 110 may be followed by step 120 of using an adaptor to position the tips of the optical fibers at predefined locations, at a second positioning accuracy that is higher than the first positioning accuracy.

Step 120 may be followed by step 130 of fixing the tips of the optical fibers to the mount while maintaining the tips of the optical fibers at the predefined locations.

Step 110 may include inserting optical fibers of an array of optical fibers through an array of openings of a mount of the optical coupler so that tips of the optical fibers pass through an array of adaptor openings, while the adaptor is configured according to a first configuration; wherein the array of openings exhibit a first degree of positioning accuracy, wherein the openings are of a first area; wherein the adaptor openings are of a second area that exceeds the first area when the adaptor is configured at the first configuration.

Step 120 may include changing a configuration of the adaptor from a first configuration to a second configuration, thereby positioning the tips of the optical fibers at predefined locations, at a second positioning accuracy that is higher than the first positioning accuracy.

Step 120 may include reducing an area of the adaptor openings to a third area that is smaller than the second area.

The third area substantially equals a cross section of a tip of an optical fiber of the array.

Step 130 may include gluing the tips of the optical fibers to the mount. Step 130 may be followed by step 140 of detaching the mount from the adapter.

The adaptor openings may be adjustable size openings and step 120 may include changing of the configuration comprises reducing a size of the adaptor openings.

The predefined positions may or may not be located at centers of the adaptor openings when the adaptor is configured according to the first configuration.

Step 120 may include feeding, by a feeder, the optical fibers through the openings of the mount and toward the adaptor, wherein the feeding exhibits a certain accuracy that is of an order of a width of positioning elements of the adaptor.

Method 100 may also include step 150 of connecting the optical coupler to an array of electro-optic elements. The predefined locations are aligned with locations of the electro-optic elements. For example—when positioned above the electro-optic elements then the optical axis of the electro-optic elements are aligned with the optical axes of the tips. Thus—the tips point to the electro-optic elements.

The electro-optic elements may be radiation transmitters and/or radiation receivers.

The adaptor may include positioning elements such as V-shaped grooves, or other structural elements that may be fixed or adjustable.

Figure 7:
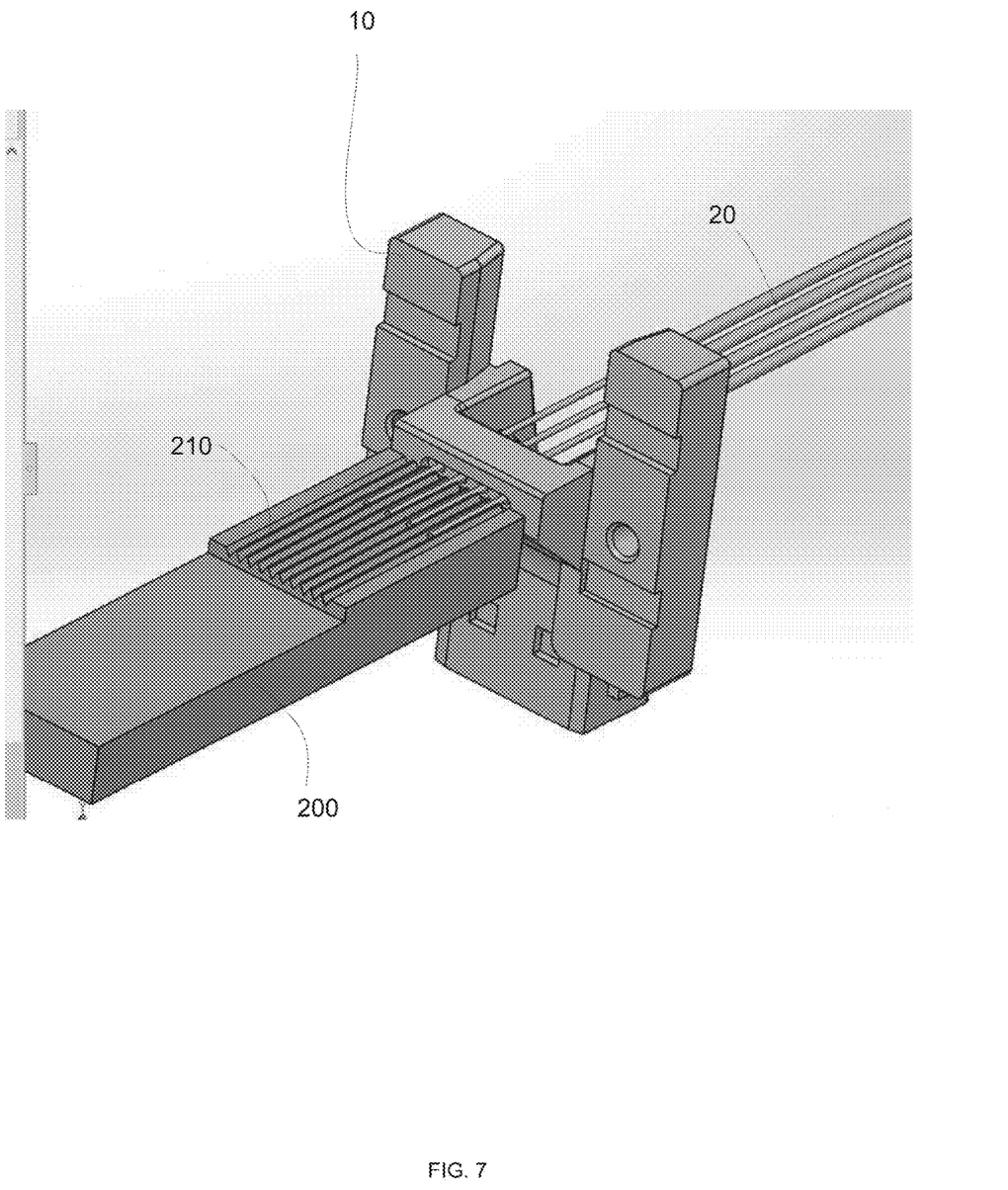
FIG. 7 illustrates an example of an optical coupler and an adaptor.

FIG. 7 illustrates an adaptor 200 that has V-grooves 210 that are positioned and shaped at high accuracy level—for example between few micron to sub-micron dimensions. Optical cables 20 are fed by a feeder (not shown) through the openings of the mount at a feeding accuracy that is of the order of the accuracy of the V-grooves. Once the optical fibers enter the V-grooves they are aligned to be at the desired location and can be fixed to the mount.

The optical fibers, after being fixed to the mount can be bent or oriented to be oriented to their feeding position.

Figure 8:
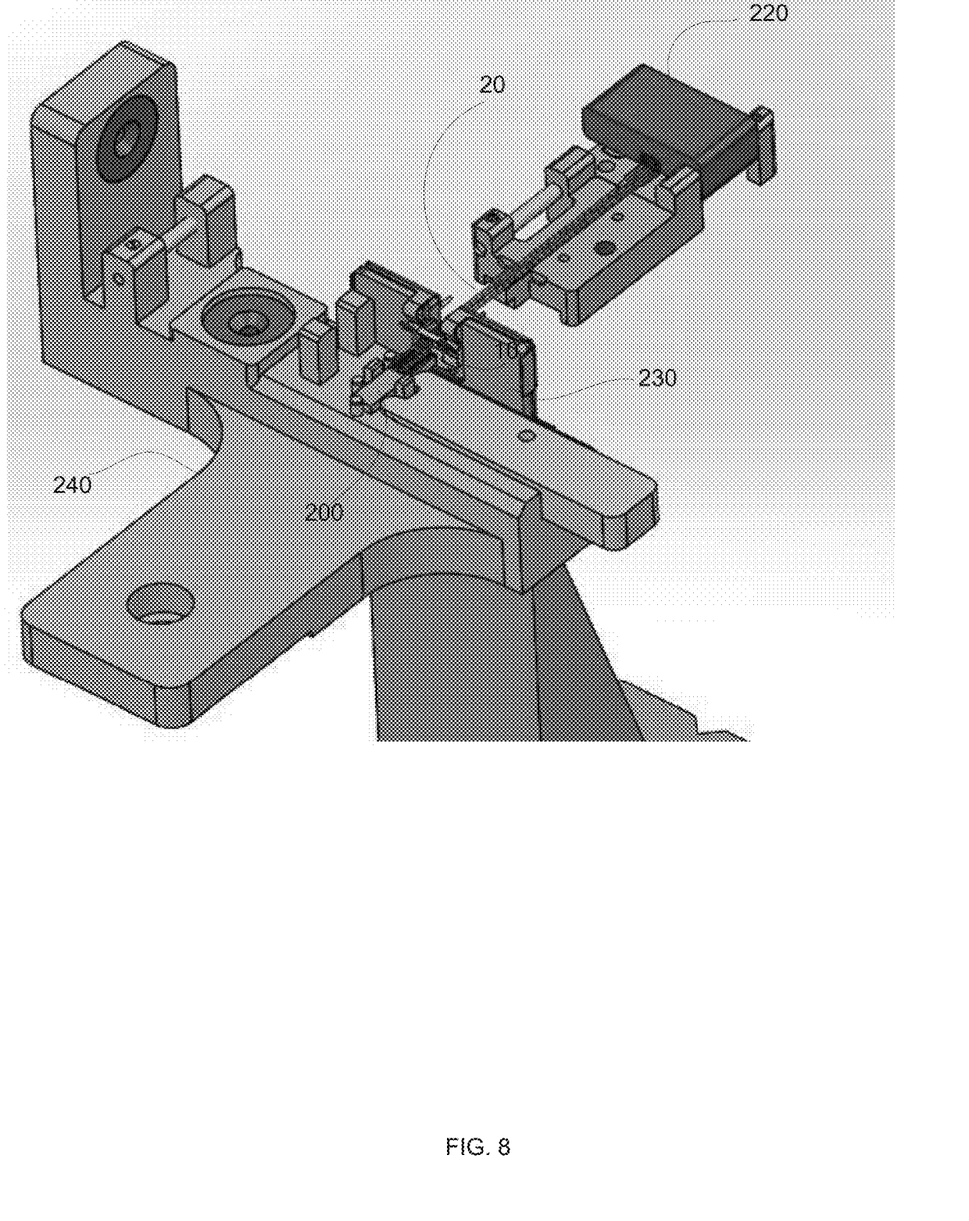
FIG. 8 illustrates an example of an assembly system.

FIG. 8 illustrates apart of an assembly system that include an adaptor holder 240 for holding the adaptor 200, a mount holder 230 for holding the mount 20 and a feeder 230 for feeding the optical fibers through the openings of the mount and towards the adaptor 200.

The adaptor holder 240 and/or the mount holder 230 can be moved in any direction.

The assembly process may be done automatically, semi-automatically or manually. The assembly process may be monitored by any monitoring means—for example a camera or any other sensor that may sense the progress of the assembly, the relative location of the optical fibers, adaptor, mount, and the like and control the assembly process according to the sensed information.

Any reference to the phrases "may" or "may be" should be applied to the phrases "may not" or "may not be".

The phrase "and/or" means additionally or alternatively.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between blocks are merely illustrative and that alternative embodiments may merge blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an."

The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for assembling an optical coupler, the method comprises:
   inserting optical fibers of an array of optical fibers through an array of openings of a mount of the optical coupler so that tips of the optical fibers pass through the array of openings of the mount and reach an adaptor; wherein the array of openings of the mount exhibit a first positioning accuracy;
   using the adaptor to position the tips of the optical fibers at predefined locations, at a second positioning accuracy that is higher than the first positioning accuracy;
   fixing the tips of the optical fibers to the mount while maintaining the tips of the optical fibers at the predefined locations; and
   detaching the mount from the adaptor.

2. The method according to claim 1 wherein the inserting of the optical fibers comprises positioning the optical fibers to reach the adaptor while the adaptor is configured according to a first configuration; and
   wherein the using of the adaptor comprises changing a configuration of the adaptor from a first configuration to a second configuration, thereby positioning the tips of the optical fibers at predefined locations, at a second positioning accuracy that is higher than the first positioning accuracy.

3. The method according to claim 2 wherein the changing of the configuration comprises reducing an area of the adaptor openings.

4. The method according to claim 3 wherein an area of an adaptor opening, following the reducing, substantially equals a cross section of a tip of an optical fiber of the array.

5. The method according to claim 2 wherein the adaptor openings are adjustable size openings and wherein the changing of the configuration comprises reducing a size of the adaptor openings.

6. The method according to claim 2 wherein the predefined positions are located at centers of the adaptor openings when the adaptor is configured according to the first configuration.

7. The method according to claim 1 comprising connecting the optical coupler to an array of radiation transmitters, wherein the predefined locations are aligned with locations of the radiation transmitters.

8. The method according to claim 1 comprising connecting the optical coupler to an array of radiation receivers, wherein the predefined locations are aligned with locations of the radiation receivers.

9. The method according to claim 1 wherein the fixing comprises gluing the tips of the optical fibers to the mount.

10. The method according to claim 1 wherein the using of the adaptor comprises feeding, by a feeder, the optical fibers through the openings of the mount and toward the adaptor, wherein the feeding exhibits a certain accuracy that is of an order of a width of positioning elements of the adaptor.

11. The method according to claim 10 wherein the positioning elements are V-grooves.

12. The method according to claim 1 wherein the changing of the configuration comprises reducing a radius of the adaptor openings from a first radius to a second radius.

13. The method according to claim 1 wherein the adaptor is a single flat jig.

14. The method according to claim 1 wherein the adaptor comprises V-grooves.

15. The method according to claim 1 wherein the fixing of the tips is followed by bending the optical fibers to be oriented to a feeding position of the tips.

16. The method according to claim 1 comprising repeating for each optical fibers of multiple optical fibers the steps of (a) inserting the optical fibers, (b) using the adaptor, (c) fixing the tips, and (d) detaching the mount from the adaptor.

* * * * *